Dec. 29, 1964 C. E. KRAUS 3,163,050
TOROIDAL TRANSMISSION BEARING MEANS
Filed June 19, 1963 3 Sheets-Sheet 2

INVENTOR.
CHARLES E. KRAUS
BY Julian Falk
ATTORNEY

Dec. 29, 1964     C. E. KRAUS     3,163,050
TOROIDAL TRANSMISSION BEARING MEANS
Filed June 19, 1963     3 Sheets-Sheet 3

INVENTOR.
CHARLES E. KRAUS
BY
ATTORNEY

United States Patent Office 3,163,050
Patented Dec. 29, 1964

3,163,050
TOROIDAL TRANSMISSION BEARING MEANS
Charles E. Kraus, Franklin Lakes, N.J., assignor to Excelermatic, Inc., a corporation of New York
Filed June 19, 1963, Ser. No. 289,019
10 Claims. (Cl. 74—200)

This invention relates to toroidal-type variable speed-ratio transmissions and is particularly directed to a novel and improved axial thrust bearing means for said transmission.

Transmissions of this type generally comprise a pair of drive members having facing toroidal or toric surfaces with a plurality of rollers (preferably three) disposed between and in friction driving contact with said surfaces and with each roller mounted for speed-ratio changing movement across the surfaces of said toroidal members to change the speed-ratio of the driving connection provided by the rollers between the toroidal members. A transmission of this type is clearly disclosed in my United States Patent No. 3,008,337, issued on November 14, 1961.

In general, the transmissions must be designed to carry substantially large loads both at the input end of said transmissions and at the output end. For this purpose, substantially large roller or ball-type bearings are normally used at each end of the transmission for supporting the input and output shafts in the transmission housing and for absorbing the large axial loads imposed on the transmission. It has generally been known that, except for unforeseen accidents or failures to the parts of the transmission, the operating life of the transmission may be measured by the operating life of the above-mentioned bearings. Since these mechanical-type bearings are subject to substantially large loads, the operating life is relatively short as compared to other parts of the transmission. Further, since these bearings must be made relatively large in order to adequately absorb the loads imposed on the transmission, they are comparatively expensive to use in said transmissions.

The present invention has for its purposes the provision of a novel and improved bearing means for absorbing axial loads on the transmission, which bearings have substantially larger loading capacity, longer operating life and are comparatively cheaper than previous bearings used in transmisisons. The invention is generally carried out by providing a hydrostatic thrust bearing means between the transmission housing and the input and output toric members for absorbing substantially all axial loads imposed on the transmission. Means are also provided for initiating a flow of fluid under pressure to the hydrostatic thrust bearing means in response to variations in axial loads so that pressure in said hydrostatic thrust bearing means will be maintained in response to load demands imposed on the fluid cavity of said hydrostatic thrust bearing means.

Accordingly, it is one object of the invention to provide a novel bearing means for supporting the transmission against axial loads imposed thereon.

Another object of the invention is to provide a novel and improved hydrostatic thrust bearing means for absorbing axial loads imposed on a toroidal-type transmission.

It is further an object of the invention to provide a novel hydrostatic bearing means for a toroidal-type transmission which bearing means has greater load capacity and longer running life than bearing means heretofore used in such a transmission.

It is an additional object of the invention to provide a novel hydrostatic bearing means for a toroidal-type transmission which has means for regulating the fluid pressure for said hydrostatic bearing means in response to load variations imposed on said transmission.

Other objects and advantages of the invention will be best understood when reading the following detailed description of the invention with the accompanying drawing in which.

Figure 1:
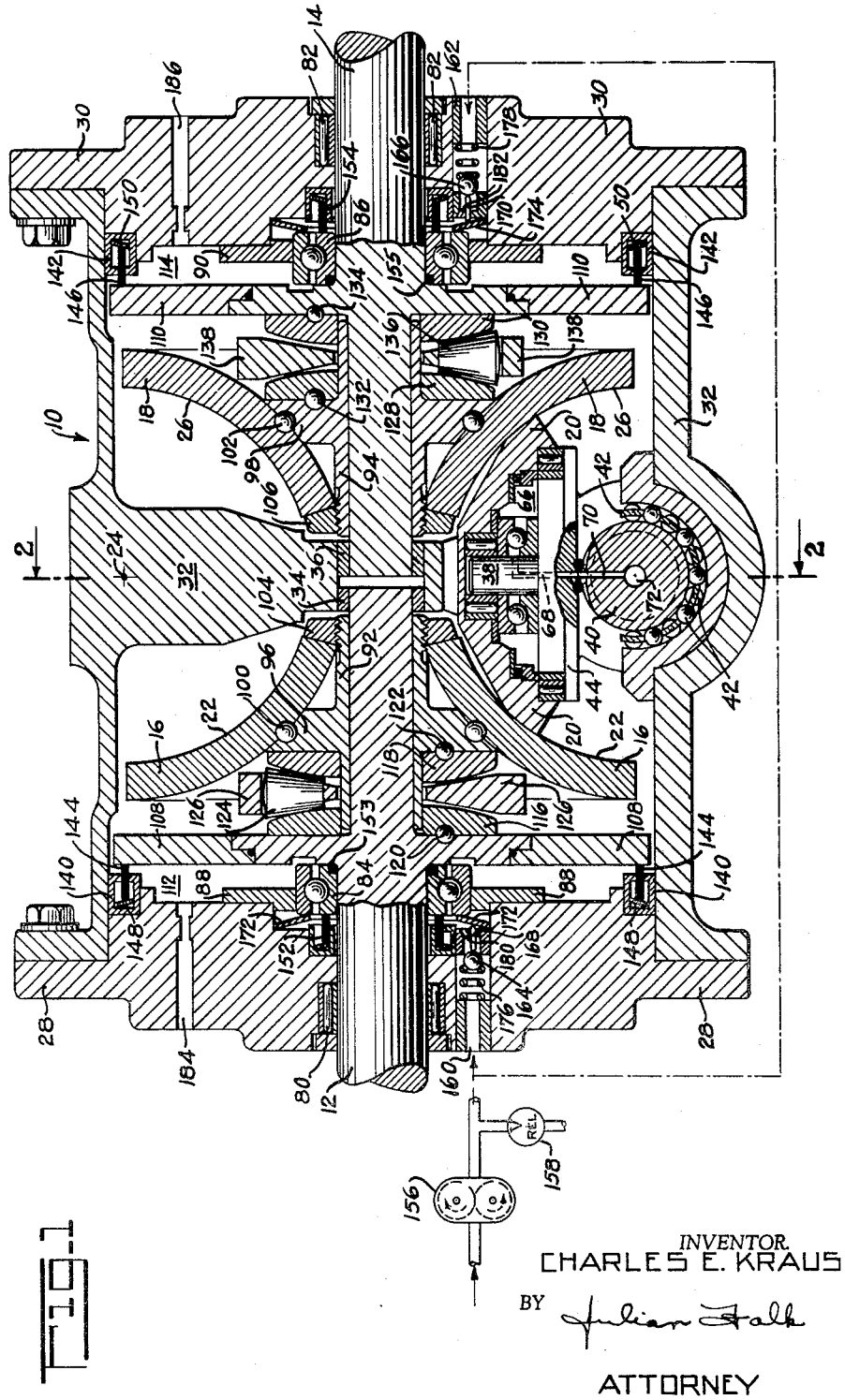
FIG. 1 is an axial sectional view through the transmission embodying the invention.
Figure 2:
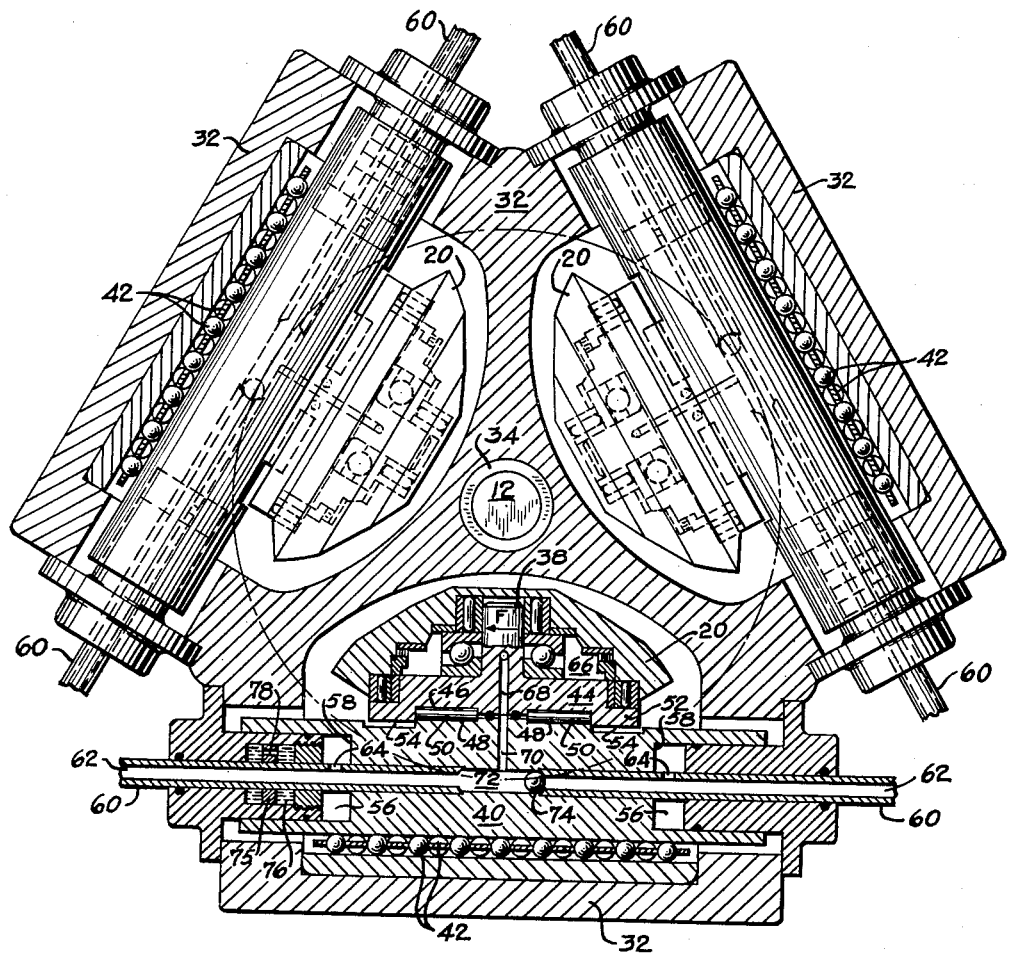
FIG. 2 is a sectional view taken along line 2—2 of FIG. 1.

Referring now to FIGS. 1 and 2 of the drawings, a transmission 10 is illustrated therein as comprising co-axial input and output shafts 12 and 14 respectively, input and output toroidal disc members 16 and 18 co-axially mounted on and drivably connected to the shafts 12 and 14 respectively and a plurality of circumferentially-spaced rollers 20 disposed between and in driving engagement with the toric surfaces of the disc members 16 and 18. Preferably, as illustrated, three rollers 20 are provided between the toroidal members 16 and 18 although the invention is not limited to this number. Also, at least one of the toroidal disc members 16 and 18 is axially movable toward the other. In the present invention, however, as illustrated in FIG. 1, both disc members 16 and 18 are movably supported on their respective shafts 12 and 14 in a manner which will be more clearly described below.

The input toroidal disc member 16 has a toroidal surface 22 which preferably is generated by rotating a substantially circular arc about the common axis of the input and output shafts 12 and 14, the center of the generating arc tracing a circle 24 as the toric surface 22 is generated. The output toroidal disc 18 has a similar toroidal surface 26 facing the input toroidal surface 22 and having substantially the same toric center circle 24.

The shafts 12 and 14 are supported in a multi-part housing including end sections 28 and 30 and an intermediate section 32 secured to said end sections in a manner which will be explained in greater detail below. The intermediate housing section 32 is a Y-shaped frame structure between which the rollers 20 are disposed, said Y-shaped structure providing end bearings 34 and 36 for the adjacent ends of the shafts 12 and 14.

Each roller 20 is supported on a spindle 38 which spindle is further supported by a pivot shaft 40 for speed-ratio changing movement of its roller about the axis of its pivot shaft 40 relative to the toroidal surfaces 22 and 26. Relative to the transmission axis, each roller 20 is disposed on the radially inner side of its associated pivot shaft 40 with the axis of each pivot shaft 40 being substantially tangent to the toroidal center circle 24 and being disposed in a plane perpendicular to the transmission axis. Thus, the pivot shafts 40, like the rollers 20, are circumferentially-spaced about the transmission axis, with one pivot shaft 40 being provided for each roller 20. Each pivot shaft 40 is journaled on a semi-cylindrical cradle-type bearing 42 carried by the intermediate housing section 32 in a manner clearly illustrated in FIGS. 1 and 2. A more detailed description of the specific type bearings, such as bearing 42, may be found in my co-pending application Serial No. 266,363 filed March 19, 1963, and entitled "Roller Support Mechanism For Toroidal Drive." Each roller spindle 38 has an end plate 44 having a pair of substantially semi-cylindrical grooves 46 facing a corresponding pair of grooves 48 in the surface of the central portion of its associated pivot shaft 40. Each such semi-cylindrical groove 46 and 48 is disposed parallel to the axis of its associated pivot shaft 40. A pair of pins 50 are received in each facing pair of grooves 46 and 48 so that through the pins 50 the associated roller 20 is supported by the shaft 40 for speed-ratio changing movement of the roller with and about the axis of its shaft 40. Each pin 50 also permits a limited pivotal movement of its associated roller 20 about the axis of said pin to equalize the contact pressures of said roller against the toric surfaces 22 and 26.

Each pivot shaft 40 has a limited movement along its axis and its associated roller spindle end plate 44 has depending portions 52 thereon which are received within corresponding cut-outs or grooves 54 in the shaft 40 so that movement of a shaft 40 along its axis results in a corresponding movement of its roller 20 in this direction. The cutouts or grooves 54 on each pivot shaft 40 are disposed with respect to the depending portions 52 on the end plate 44 so that said grooves 54 and the depending portions 52 do not interfere with the limited pivotal movement of the associated roller spindle 38 about the axis of the pins 50 to equalize the contact pressures of the associated roller 20 against the toric surfaces 22 and 26.

If the direction of rotation of the transmission is such that as viewed in FIG. 2 the input toric member 16 rotates clockwise, the traction forces F exerted by the toric members 16 and 18 on for example, the lower roller 20, are directed toward the left. Any unbalance of the traction forces on a roller and the forces along and on its pivot shaft 40 results in movement of the roller and its pivot shaft 40 along the axis of said shaft. As fully explained in the aforementioned patent, such movement of the roller with and about the axis of its pivot shaft 40 is to a speed-ratio position in which said forces are again in balance.

As is known, speed-ratio changing movement of the rollers may also be produced by tilting of each roller about an axis through or parallel to a line through the points of contact of the roller with the toric members 16 and 18. As is also disclosed in said patent, if such a roller tilt axis is offset from a line through the roller points of contact with the toric members, then the traction forces exerted by the toric members 16 and 18 on each roller apply a turning moment on the roller about its tilt axis which may be balanced by a hydraulic control force. Accordingly, it is within the scope of this invention to use such roller tilting to induce speed-ratio changing movement of the rollers instead of shifting of each roller along the axis of its pivot shaft 40.

As stated above, speed-ratio changing movement of the rollers 20 may be induced by translational movement of the pivot shafts 40 along their axes. For this purpose, a fluid control pressure may be applied to both ends of the pivot shafts 40 so that translational movement of the pivot shafts 40 will be induced in accordance with the fluid pressure differential applied thereto. Each pivot shaft 40 is provided with a hydraulic control cylinder 56 at each end thereof so that a fluid pressure may be provided in said cylinders 56 to act against the faces 58 of each pivot shaft 40, which act as piston members, for movement of said pivot shafts along their axes in response to said fluid pressure. Each pivot shaft 40 is also provided with a shaft member 60 fixed in each end thereof with each shaft member 60 having fluid passages 62 and 64 therein for supplying the hydraulic control cylinders 56 with said fluid pressure. Therefore, it will be apparent that, when the net fluid pressure force acting on pivot shaft 40 and the traction forces F on its associated roller 20 are not in balance, speed-ratio changing movement of the rollers 20 will be induced to a position in which the forces are again in balance. A suitable fluid pressure control means, such as that shown in my co-pending application Serial No. 289,022 filed June 19, 1963 and entitled "Roller Construction for Toroidal Drive", may be provided for controlling fluid pressure supplied to the hydraulic control cylinders 56 for thereby controlling the speed-ratio position of the rollers.

As further disclosed in said co-pending application "Roller Construction for Toroidal Transmission," Serial No. 289,022, each roller may be provided with a fluid thrust bearing. The fluid thrust bearing may take the form of that illustrated in FIGS. 1 and 2 of the present application wherein there is shown in each roller an annular cavity portion 66 which communicates with the hydraulic control pressure through a fluid passage in the spindle 38, said fluid passage being indicated at 68, a fluid passage 70 in pivot shaft 40 which terminates in a central cavity 72 in pivot shaft 40 connected with the passages 62 in the shaft 60. A ball member 74 is positioned in the cavity 72 so that when the fluid pressure is greater in one of the passages 62 than the other of said passages, the ball valve 74 will be forced against the opening of the other of said passages 62 to prevent the fluid pressure from flowing from the passage 62 having the greater pressure into said other passage 62. As further disclosed in said co-pending application, the rollers 20 are movable along their spindle axis in response to the fluid pressure in the cavity 66 for urging the rollers into contacting engagement with the disc members 16 and 18. The rollers 20 are therefore urged into contact with said disc members 16 and 18 in proportion to the fluid pressure inducing speed-ratio changing movement of said rollers. Reference may be made to said co-pending application for the specific details of the fluid thrust bearing for the rollers 20. However, it should be understood that in lieu of the fluid pressure thrust bearings 66 for the rollers, insofar as the present invention is concerned, the rollers 20 may be supported on their spindles 38 by mechanical-type bearings of the type illustrated in said above mentioned patent and separate means provided for axially loading the disc members 16 and 18 into contacting engagement with the rollers 20.

A damping mechanism may also be provided for damping sudden translational movement of the pivot shafts 40 so that undesirable sudden speed-ratio changing movements of the roller 20 will be prevented. The damping mechanism may take the form of a damping piston 75 fixed to one of the shafts 60 and positioned in a sealed liquid cavity 76 as illustrated in FIG. 2. A restricted passageway 78 is provided in said piston 75 so that movement of the piston forces liquid to flow through the restricted passageway 78 from one side of the piston to the other thereby dampening translational movements of the pivot shaft 40. The damping mechanism itself forms no part of the present invention and reference may be made to United States Patent No. 3,048,047 issued on August 7, 1962, for a more detailed description of the damping mechanism.

The shafts 12 and 14 are respectively supported in end housings 28 and 30 through bearings 80 and 82 at their axially outer ends relative to the transmission housing and at the inner portions of end housings 28 and 30 through bearings 84 and 86 which support said shafts 12 and 14 on said end housings through annular members 88 and 90 secured to the end housings. Each of the shafts 12 and 14 has a sleeve member 92 and 94 respectively rotatably movable on said shafts and also supported for limited axial movement along the transmission axis relative to said shafts 12 and 14. As illustrated in FIG. 1 each of the sleeve members 92 and 94 has a radially extending annular portion 96 and 98 through which the disc members 16 and 18 are suitably keyed as by balls 100 and 102. The disc members 16 and 18 are supported on the axially inner ends of each of the sleeve members 96 and 98 as by nuts 104 and 106. It will be seen therefore that the disc members 16 and 18 are rotatably fixed to their respective sleeve members 92 and 94.

Relative to the transmission axis, each of the shafts 12 and 14 has a radially extending flange member or disc member respectively designated at 108 and 110. The disc members 108 and 110 may be of one piece construction but for purposes of fabrication are made in two pieces. As illustrated in FIG. 1, it can be seen that an annular space is formed between the end housing 28 and disc member 108 and between the end housing 30 and disc member 110, said annular spaces being designated 112 and 114. The purposes of said annular spaces 112 and 114 will be described in greater detail below.

Suitably keyed to radially extending disc members 108 of shaft member 12 is an annular cam member 116 having a plurality of circumferentially-spaced cam recesses (not shown) facing corresponding cam recesses on cam member 118 which is suitably keyed to the annular portion 96 of sleeve member 92. The cam members 116 and 118 may be respectively keyed to members 108 and 96 by balls 120 and 122. A conically shaped cam roller 124 is disposed within each facing pair of said cam recesses and a cage 126 is provided for maintaining the rollers in position. Similarly supported on annular portion 98 of sleeve member 94 and radially extending disc member 110 of shaft 14 are cam members 128 and 130 respectively keyed to said members 98 and 110 through balls 132 and 134. Cam roller members 136 are similarly disposed between the cam members 128 and 130 and maintained in position by a cage member 138. Upon application of torque to the input shaft 12 the cam member 116 rotates relative to the cam member 118 to wedge the cam rollers 124 therebetween for transmitting said torque and thereby axially loading the toroidal disc members toward each other and against the rollers. Torque applied to the output shaft 14 is similarly transmitted through its cam and roller mechanism to transmit the torque to the toric member 18 to load the toroidal disc members toward each other as explained above.

As explained above an annular space 112 and 114 is formed at each axial end of the transmission. Relative to the transmission axis, the cavities 112 and 114 are sealed at their radially outward extending portions by seal means respectively comprising ring members 140 and 142 having respective sealing members 144 and 146 movably supported therein and engaging disc members 108 and 110. The sealing members 144 and 146 may be biased into sealing engagement with their respective discs 108 and 110 as by springs 148 and 150, which may be Belleville-type springs. The cavities 112 and 114 are similarly sealed at their radially inward portions by seal means 152 and 154, respectively, each having its sealing member engaging the radially inner race of bearings 84 and 86. Sealing means such as O rings 153 and 155 illustrated in FIG. 1 may also be provided for insuring the sealing off of fluid flow between the inner race of bearings 84 and 86 in their respective shafts 12 and 14.

A suitable means for supplying fluid under pressure to the cavities 112 and 114 is provided and may take the form of that diagrammatically illustrated in FIG. 1. As shown therein the fluid supply means may comprise a pump 156 which may be a gear type pump, having a pressure relief valve connected to the output side of said pump, said valve being designated 158, with said pump 156 being connected to the cavities 112 and 114 through suitable passage means 160 and 162 in end housings 28 and 30 respectively. Positioned in each of the passages 160 and 162 is a ball valve 164 and 166 each having a needle 168 and 170, respectively, extending axially therefrom. The needles 168 and 170 of the ball valves 164 and 166 are maintained in light yielding contact, with a Belleville spring 172 and 174 by spring members 176 and 178. The Belleville springs 172 and 174 are in turn in yielding contact with the radially outer race of bearings 84 and 86, respectively, with the inner race of said bearings 84 and 86 in contacting engagement with the disc members 108 and 110. The arrangement is such that once the cavities 112 and 114 are filled with fluid under pressure substantially all the axial thrust on the disc members 108 and 110 will be transmitted to the housing end walls 28 and 30 by the fluid in said cavities 112 and 114 so that substantially all axial loads imposed on the transmission will be absorbed by said fluid. Thus only a small portion of the axial load is carried by the bearings 84 and 86. Hence these bearings can be made quite small. Openings 180 and 182 are respectively provided in each end wall 28 and 30 for permitting fluid to flow from passages 160 and 162 into cavities 112 and 114 when the ball valves 164 and 166 are moved away from their seats by the needles 168 and 170.

Bleed openings 184 and 186 may be provided in end housings 28 and 30 for bleeding off fluid from said cavities 112 and 114 to enable the valves 164 and 166 to control the pressure in said cavities and also for providing an exchange of the oil in said cavities in order that the oil therein does not become overheated. This leakage or bleeding off of the oil may also be provided at the seals 140 and 142. When the oil in said cavities decreases as by flow of said oil out of said bleed openings 184 and 186, the pressure in said cavities 112 and 114 will also decrease and the disc members 108 and 110 in reaction to the torque load will move against the Belleville springs 172 and 174 for permitting fluid under pressure to flow into said cavities. Therefore, it will be seen that the pressure in said cavities 112 and 114 will be automatically maintained to balance the axial load on the toroidal disc members 16 and 18 as the fluid bleeds off through the openings 184 and 186. In addition the pressure in the cavities 112 and 114 will automatically increase or decrease with the transmission torque load. Thus any increase or decrease in the torque load will cause the cam rollers 124 and 136 to increase the axial load on the toroidal disc members 16 and 18 and will cause a corresponding increase in the reaction load on the bearings 84 and 86 whereupon said bearings will shift against their springs 172 and 174 to further open their respective valves 164 and 166 thereby producing a corresponding increase in pressure in the cavities 112 and 114.

It will be apparent from the above description that a novel fluid thrust bearing is provided for absorbing the major portion axial thrust loads imposed upon either end of the transmission. Due to the large surface area provided by said fluid thrust bearing the loading capacity of the transmission is substantially increased and since large mechanical-type bearings are eliminated for this purpose and substantially all loads are absorbed by a fluid, the operating life of the transmission as a whole is increased.

Figure 3:
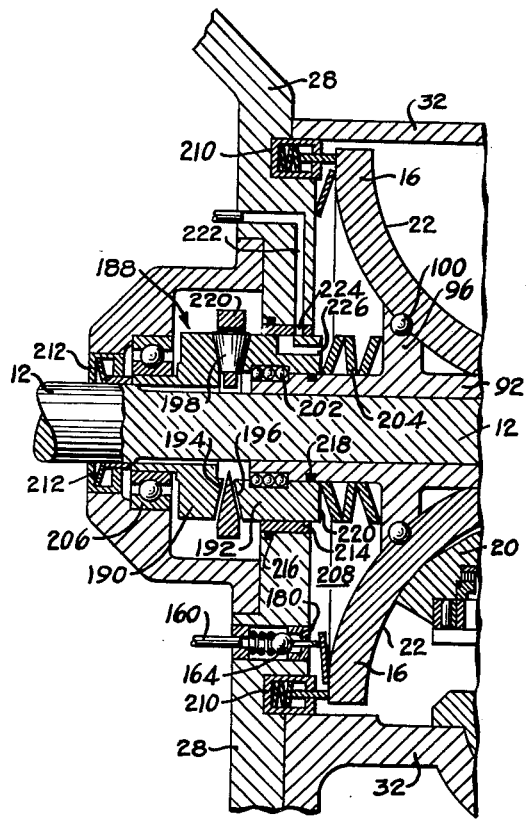
FIG. 3 is a partial axial sectional view of a transmission showing another embodiment of the invention.

FIG. 3 illustrates a partial sectional view of the input end of a transmission showing another embodiment of the invention. In the sectional view of the transmission shown in FIG. 3 the sleeve member 92 surrounding input shaft 14 is keyed to an annular cam member 188 with said cam member 188 comprising two sections 190 and 192 having facing cam surfaces 194 and 196. Disposed between the cam sections 190 and 192 and engaging their respective cam surfaces 194 and 196 is a plurality of cam rollers 198 supported in a cage member 200 whose function is similar to that of the rollers 124 of the embodiment shown in FIG. 1. The cam member 188 is axially movable with the shaft 14 and sleeve member 92 through the balls 202 which key said cam member 188 to said sleeve member 92 for axial movement therewith but with said sleeve member 92 and shaft 14 being rotatable with respect to said cam member 188. A Belleville spring 204 is provided between the cam member 188 and the radially extending portions 96 of sleeve member 92 to axially preload the disc members 16 and 18 against the rollers 20. A bearing 206 is provided in surrounding engagement with an axially extending portion of the cam section 190 to support the input shaft 14 in the end housing 28 for radial loads imposed thereon.

The embodiment of FIG. 3 has an annular space for supplying fluid under pressure thereto indicated at 208, said annular space 208 being formed by the axially inner face of the end housing 28 and the back portion of the input toroidal member 16. As will be apparent from FIG. 3, the back portion of the input toroidal member 16 functions in the same manner as the thrust bearing disc member 108 of the embodiment of FIG. 1. The cavity or annular space 208 is sealed at its radially outer portion through a seal means 210, similar to that of the embodiment of FIG. 1, and at its radial inner portions through a seal means 212 which provides sealing contact against an axial extending portion of the cam section 190. The cam member 188 is further supported in the end housing 28 by an annular bearing member 214 with suitable seal means 216, as indicated at FIG. 3. A suitable seal 218 is also provided between an axial extending portion of sleeve member 92 to provide a seal between said sleeve member 92 and the cam 188.

When torque is applied to the input shaft 12 it will be transmitted through the cam section 190, cam rollers 198 and cam section 192 which will move axially in response to said torque load. As the cam section moves axially inwardly, it will compress the spring 204 against the radially extending portion 96 of sleeve member 92 and thus mechanically urge the toric member 16 against the rollers 20. In addition, as a result of this motion of cam section 196, its inner end face 220 functions as a piston and will act against the fluid in the cavity 208 to increase the fluid pressure therein and thereby increasing the axial fluid force for loading the toroidal disc member 16 into contacting engagement with the rollers 20 with the increasing torque load applied to the input shaft 12. It will be apparent that the axial force transmitted through the cam rollers 198 by the cam section 190 to the cam section 192 will result in a substantial amplification of the fluid force against the toric member 16 since the piston area of the cam section 192 acting on the fluid in cavity 208 is much less than the area of the disc member 16.

Means may also be provided for supplying fluid under pressure to the cavity 208 as a function of the position of cam section 192 within the cavity 208. Said means may take the form of a fluid passage 222 in the end housing 28 which may suitably be connected to the fluid supply comprising the pump 156 (not shown in FIG. 3) with said fluid passage communicating with a fluid passage 224 in the bearing 214 and a fluid passage 226 in the cam section 192. When a substantially large torque load is applied to the input shaft 14 and the cam section 192 is caused to move substantially axially inward toward the cavity 208 in response to said substantially large torque load, the passage 226 in said cam section 192 will align itself with the passages 224 and 222 for supplying additional fluid pressure to the cavity 208 so that the large torque load will be transmitted through said fluid in the cavity 208 for loading the input toroidal disc 16, as explained above. A suitable means such as valve 164 for supplying fluid under pressure to the cavity 208 is also provided for supplying fluid under pressure in response to the position of the input toroidal disc member 16 similar to that shown in FIG. 1 as in the case of the disc member 108. It should also be understood that a fluid thrust bearing is also provided on the output end of the transmission in the embodiment of FIG. 3.

It will also be apparent that, since the torque applied to input shaft 14 is substantially amplified through the cam section piston face 220 and the fluid in cavity 208 acting on the input toroidal disc 16, the cam rollers 198 and their respective cam recesses can be made substantially smaller than for example the rollers in cam surfaces of the embodiment of FIG. 1. This also results in a reduction of cost and as a reduction in the overall size of the transmission.

In each of the embodiments described herein a novel and improved bearing means for a toroidal-type transmission is provided, which in comparison to its mechanical-type counterpart, is capable of carrying higher axial loads, has a substantially longer operating life, is cheaper to produce and use and contributes to an overall increase in efficiency of the transmission. The bearing means of the invention also permits the use of larger rollers for increasing the overall loading capacity of the transmission.

While I have described my invention in detail in its present preferred embodiment it will be obvious to those skilled in the art after understanding my invention, that various changes and modifications may be made therein without departing from the spirit and the scope thereof. For example, one such modification may comprise the use of a fixed flow of fluid through the fluid thrust bearing means which flow of fluid pushes the fluid thrust bearing disc member to open an annular gap in the fluid thrust bearing cavity to allow flow across said gap. I aim in the appended claims to cover all such modifications.

I claim:

1. A variable speed-ratio transmission comprising:
   (a) a housing including a pair of end walls;
   (b) an input shaft and an output shaft co-axially supported in said housing;
   (c) co-axial input and output toroidal members having facing toric surfaces respectively supported on said input shaft and said output shaft;
   (d) a plurality of circumferentially-spaced rollers disposed between and in driving contact with said surfaces for transmitting torque from the input member to the output member;
   (e) support means for each roller including a pivot shaft supporting each said roller for speed-ratio changing pivotal movement across said toric surfaces for varying the speed of said output member relative to the speed of said input members;
   (f) means for loading the toroidal members axially against the rollers with a force which increases and decreases with transmission torque load;
   (g) fluid thrust bearing means between each toroidal member and its adjacent end wall for transmitting at least a major portion of said axial loads to the end walls; and
   (h) means automatically responsive to increases and decreases in the axial loading of the toroidal members against the rollers for increasing and decreasing the pressure in said fluid thrust bearing.

2. A variable speed-ratio transmission is recited in claim 1 wherein said fluid thrust bearing means includes:
   (a) a substantially annular fluid thrust bearing space between said toroidal members and their adjacent end walls and extending radially from said input shaft and said output shaft for receiving a fluid under pressure therein;
   (b) means for sealing each said fluid thrust bearing space at its radially outward and radially inward portions for maintaining fluid pressure within said fluid thrust bearing spaces.

3. A variable speed-ratio transmission as recited in claim 2, said fluid thrust bearing means further including:
   (a) a radially extending flange member supported on said input shaft and said output shaft and positioned between said toroidal members and their adjacent end walls and said fluid thrust bearing spaces being defined between said flange members and the adjacent end walls.

4. A variable speed-ratio transmission as recited in claim 3 wherein said means automatically responsive for increasing and decreasing the pressure in said fluid thrust bearing includes:
   (a) valve means operatively engaging said flange members and responsive to axial movement of said flange members in one direction for initiating a flow of fluid under pressure into said fluid thrust bearing spaces for increasing the fluid pressure therein.

5. A variable speed-ratio transmission as recited in claim 4 wherein movement of said flange members in said one direction comprises:
   (a) movement of each of said flange members toward its adjacent end wall in response to increases in axial loading of the toroidal members such that said valve means is opened for initiating said flow of fluid under pressure into said fluid thrust bearing spaces.

6. A variable speed-ratio transmission as recited in claim 2 wherein said means for loading the toroidal members axially against the rollers includes:
   (a) cam members supported on said input shaft and said output shaft with said cam members each having a portion thereof being axially movable into said fluid thrust bearing spaces in response to increases in torque load; and
   (b) spring means positioned between said cam portions and said toroidal members for mechanically transmitting axial loads from said cam portion to said toroidal members in response to axial movement of said cam portions into said fluid thrust bearing spaces.

7. A variable speed-ratio transmission as recited in claim 6 said cam portions include:
   (a) a piston face on each said cam portion for movement against the fluid in said fluid thrust bearing spaces such that for an increase in axial load said piston face acts against the fluid to increase the fluid pressure and thereby increase the axial loading force on said toroidal members.

8. A variable speed-ratio transmission as recited in claim 7 wherein:
   (a) said fluid thrust bearing spaces have a cross-sectional area substantially larger than the cross-sectional area of said piston faces so that the axial loading force is substantially amplified through the fluid in said fluid thrust bearing spaces.

9. A variable speed-ratio transmission as recited in claim 8 further comprising:
   (a) means for initiating a flow of fluid under pressure into said fluid thrust bearing spaces in response to axial movement of said cam portions into said fluid thrust bearing spaces.

10. A variable speed-ratio transmission as recited in claim 2 wherein said means automatically responsive for increasing and decreasing the pressure in said fluid thrust bearing includes:
   (a) valve means operatively engaging said toroidal members and responsive to axial movement of said toroidal members induced by increases in axial loading for initiating a flow of fluid under pressure into said fluid thrust bearing spaces for increasing the fluid pressure therein.

References Cited in the file of this patent
UNITED STATES PATENTS
3,087,348     Kraus _____ Apr. 30, 1963